(No Model.)

M. E. WROE.
TRACE AND TRACE CHAIN SUPPORTER.

No. 430,163. Patented June 17, 1890.

Witnesses:
Edward S. Fenwick
P. H. Fontaine

Inventor:
Missouri E. Wroe
by his Attorneys
Mason, Fenwick & Lawrence

UNITED STATES PATENT OFFICE.

MISSOURIA E. WROE, OF BRENHAM, TEXAS.

TRACE AND TRACE-CHAIN SUPPORTER.

SPECIFICATION forming part of Letters Patent No. 430,163, dated June 17, 1890.

Application filed April 10, 1890. Serial No. 347,313. (No model.)

*To all whom it may concern:*

Be it known that I, MISSOURIA E. WROE, a citizen of the United States, residing at Brenham, in the county of Washington and State of Texas, have invented certain new and useful Improvements in Trace and Trace-Chain Supporters and Back-Bands of Harness; and I do hereby declare the following to be a full, clear, and exact description of the invention, such as will enable others skilled in the art to which it appertains to make and use the same.

My invention relates to an improvement in that type of trace or trace-chain supporting and retaining device which is applied on the back-band of harness, and admits of the trace or chain being readily detached therefrom without disconnecting the ends of the trace or chain from the hames and singletree or other parts to which it is attached; and the improvements consist—

First. In an open or skeleton plate provided with a central cross-bar having laterally-projecting pins by which it is connected to and supported at different altitudes on a harness back-band having transverse rows of adjusting-holes, said plate also being extended downwardly, outwardly, and upwardly in form of an open loop or hook for the reception and support of the trace or chain, and its hook portion being provided with an opening in its upturned portion, and on said plate a curved spring-acting trace or chain keeper being pivoted, so as to swing downward outside the upturned part of the hook and enter the said opening therein above the trace or chain and reach to or nearly to the inner branch of the loop, thus guarding the upturned end of the loop and confining and preventing the trace or chain getting out of the loop.

Second. Another improvement lies in the peculiar construction, arrangement, and combination of the pivoted springy trace or chain keeper, and the hook or loop having its outer branch perforated, whereby the keeper itself is enabled to act as a spring, and after being sprung into its place is retained above the trace or chain by the conjoint agency of a shoulder or offset on the keeper and the outer branch of the loop or hook.

Third. Another improvement lies in providing a means whereby a protection-pad may be applied to the supporting device on its inner side, and thus galling and injury to the horse from the supporter are prevented.

Figure 1:
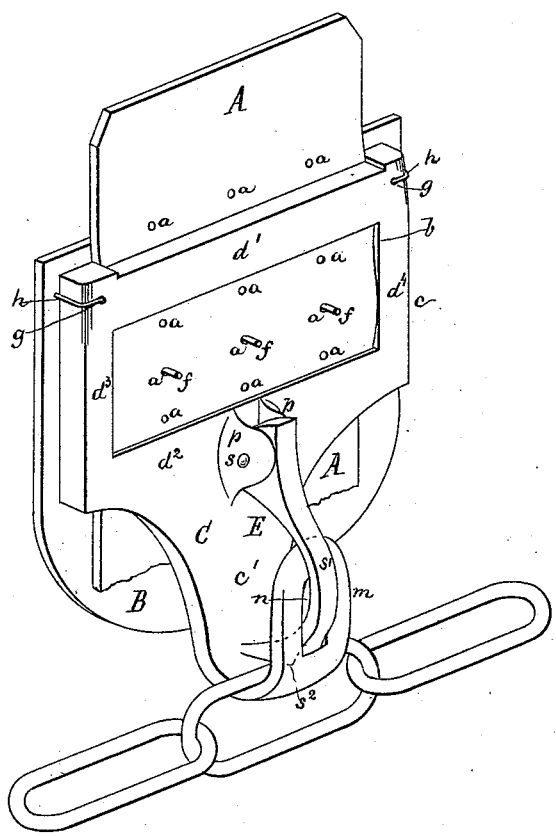
Figure 2:
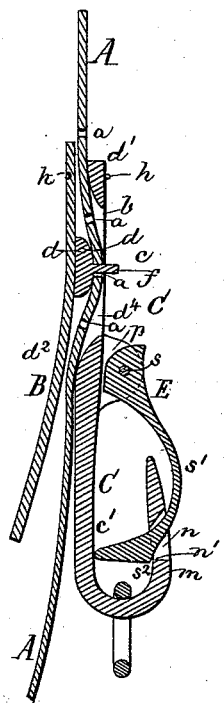

Figure 1 is a perspective view of my invention, and Fig. 2 a vertical central section, at right angles to Fig. 1, of the same.

A represents a harness back-band, B a protection-pad, and C the trace or trace-chain supporter. The back-band is provided with two or more transverse rows of adjusting-holes $a$, whereby the supporter can be set higher or lower upon it, according to the requirements of the case. The supporter is constructed or cast with a rectangular or other suitably-shaped opening $b$ through its upper portion $c$, and centrally across this opening a transverse bar $d$ is provided. This bar $d$ is flush on its inner side with the inner surfaces of the side bars $d^3$ $d^4$ of the portion $c$, while its upper surface lies to about the thickness of the back-band below the outer surface of the said side bars. The upper bar $d'$ of the portion $c$ has its outer surface flush with the outer surface of said side bars, while its inner surface lies on about a plane with the outer surface of the central bar $d$, and said inner surface is beveled, as shown. The bottom bar $d^2$ of portion $c$ is about as thick as the side bars, and is beveled, as shown.

In the central bar $d$ a transverse row of holding-pins $f$ are provided, and the supporter C, when slipped upon the back-band, as illustrated, is held at the proper altitude by said pins, which are entered through one or the other of the rows of adjusting-holes $a$.

At the top corners of the portion $c$ holes $g$ are provided, and through these holes pliable thongs $h$, attached to the pad B, are passed and secured, and thus the pad is kept in position between the supporter and the horse. The portion $c$ from its lower part $d^2$ has a gradually-narrowed extension $c'$ formed on it. This extension is in the shape of an open loop or hook $m$, as shown, and in the front branch of this loop or hook a transverse opening $n$ is provided. Above the hook, on the portion $c$, two lugs $p$ are provided, and between these lugs a curved keeper E is loosely secured by a pivot $s$. This keeper is made with its lower end long enough to extend into the hook and reach to, or nearly to, the inner branch of the hook when it is serving for retaining the trace or chain, while its other portion is sufficiently bowed to occupy a position outside the hook and act as a guard over the hook and prevent the opposite chain interfering. At the point $s'$ the keeper is made sufficiently thin with respect to its other portions to be able to spring slightly, and at the point $s^2$ it is formed with a slight shoulder or offset. The distance from the pivot $s$ of the keeper to its offset $s^2$ is a little greater than the distance between the said pivot and the lower part $n'$ of the said opening $n$, and therefore when the keeper is pressed downwardly and laterally through the opening $n$ a slight contraction of the length of the keeper becomes necessary in order to permit its offset to pass by the said part $n'$, and this being so the provision at $s'$ for the keeper to yield at the point $s$ and become slightly more bowed during the passage of the offset over the part $n'$ of the opening is important; but as soon as the offset has passed said part the keeper resumes its original shape and forces the offset downward beyond the part $n'$ on the inside of the hook, and thereby causes the keeper to become sufficiently secured to prevent its passing out of the opening until it is snapped out by the hand of the attendant, which is easily done by pulling slightly upon the keeper in an upward direction.

With my invention, the keeper being raised and the trace or chain set into the hook or loop, the keeper is lowered and snapped past the point $n'$ of the opening $n$, and thus adjusted it occupies a position above the trace or chain, leaving the chain freedom to vibrate the length of a link in a longitudinal direction, and also to have slight play upward and downward, while it is effectually prevented from getting out of the hook.

The invention is simple, effective for holding and supporting the trace or chain, adapted to be adjusted to different heights, and admits of a protection-pad being employed.

What I claim as my invention is—

1. The trace or chain supporter consisting of a hook perforated at its front, and a pivoted keeper constructed and arranged substantially as described—namely, with a spring portion at $s'$ and an offset locking formation $s^2$, and pivoted at $s$, and its lower end portion adapted to extend across the space between the branches of the loop portion of the supporter to a necessary extent, and at its intermediate portion capable of contracting and allowing the said lower portion to enter the perforation in the front branch of the loop, and then to expand and lock itself within the loop above the trace or chain, substantially as described.

2. The combination, with the upper portion $c$ of the supporter, of the lugs $p\ p$, hook or loop $m$, having a perforation $n\ n'$ through its front branch, and a pivoted spring snap-keeper E, which is itself made springy between its upper and lower ends, and is formed with a locking-offset $s^2$, and is capable of contracting while entering the said perforation and of expanding after entering a proper distance, and thereby lock itself and confine the trace or chain within the supporter, substantially as described.

3. The trace or chain supporter comprising a pendent flap-pad, and a portion $c$, having a depressed central bar $d$, reduced top bar $d'$, and bevel lower bar $d^2$, supporting-pins $f$ in the central bar, narrowed hook-shaped extension $c'\ m$, the portion $m$ having an opening $n\ n'$ in its front branch, lugs $p\ p$, and a pivoted keeper E, which is itself springy between its ends and is constructed with a locking-offset $s^2$ at its heel, substantially as described.

In testimony whereof I hereunto affix my signature in presence of two witnesses.

MISSOURIA E. WROE.

Witnesses:
H. F. PAHL,
J. P. WROE.